United States Patent [19]

Klinner

[11] Patent Number: 4,720,962
[45] Date of Patent: Jan. 26, 1988

[54] APPARATUS FOR PICKING UP AND CONVEYING CROP OR OTHER MATERIAL

[75] Inventor: Wilfred E. Klinner, Milton Keynes, England

[73] Assignee: National Research Development Corporation, London, England

[21] Appl. No.: 701,197

[22] Filed: Feb. 13, 1985

[30] Foreign Application Priority Data

Feb. 14, 1984 [GB] United Kingdom ............... 8403838
Jun. 29, 1984 [GB] United Kingdom ............... 8416568
Jul. 29, 1984 [GB] United Kingdom ............... 8221910

[51] Int. Cl.$^4$ .......................................... A01D 75/18
[52] U.S. Cl. .................. 56/10.2; 56/DIG. 15; 130/27 JT
[58] Field of Search ............ 56/10.2, DIG. 15; 130/27 JT

[56] References Cited

U.S. PATENT DOCUMENTS

| | | | |
|---|---|---|---|
| Re. 23,972 | 3/1955 | Renning . | |
| 3,675,660 | 7/1972 | Girodat | 56/DIG. 15 |
| 3,676,988 | 7/1972 | Hauser-Lienhard | 56/1 |
| 4,233,803 | 11/1980 | Davis et al. | 56/14.9 |
| 4,294,062 | 11/1981 | Seymour | 56/DIG. 15 X |
| 4,322,937 | 4/1982 | Hollmann | 56/DIG. 15 X |
| 4,344,074 | 8/1982 | Strasser et al. | 56/DIG. 15 X |
| 4,433,528 | 2/1984 | Bohman | 56/DIG. 15 X |

FOREIGN PATENT DOCUMENTS 1010176 11/1965 United Kingdom .
1214840 12/1970 United Kingdom .
1602475 11/1981 United Kingdom .

OTHER PUBLICATIONS

"Electronic Metal Detection for Forage Harvesters by C. E. Bohman and T. L. Stiefvater, in Grain and Forage Harvesting, pp. 270 to 273, published in Proc. Int. Grain & Forage Harv. Conf. ASAE/CIGR, Ames, Iowa, Sep. 1977".

Primary Examiner—Carlton R. Croyle
Assistant Examiner—T. Olds
Attorney, Agent, or Firm—Cushman, Darby & Cushman

[57] ABSTRACT

Apparatus for picking up and conveying crop has a high-speed rotor 21 mounted on a mobile frame 50 for movement over the ground to pick up previously cut crop. A hood 54 extends around part of the front of the rotor and moves relative to the frame in response to the crop to effect automatic adjustment of the clearance. Heavy unwanted objects, whether metallic or non-metallic, are detected by an impact detector 25A. Metallic objects (whether large or small) are detected by an electromagnetic detector 25B. The detectors are positioned in various alternative locations, either on the moving hood, or on static portions of the frame.

16 Claims, 11 Drawing Figures

APPARATUS FOR PICKING UP AND CONVEYING CROP OR OTHER MATERIAL

The present invention relates to apparatus for picking up and conveying crop or other material, and is concerned in particular, but not exclusively, with forage harvesters for picking up previously cut crop lying on the ground, or for picking up crop from the rear of a cutting device.

It is a well known hazard of forage harvesters, particularly of the precision chop type, that objects differing from the crop, for example stones, pieces of metal, and like objects heavier than the crop, tend to be fed to the chopping mechanism along with the cut crop. This may occur both when the crop is cut by the forage harvester, and when the crop has been cut previously and is merely picked up by the forage harvester, for example after a period of field wilting. It is known in such apparatus to provide a vibration detector such as an accelerometer or a microphone for detecting vibrations caused by objects striking parts of the apparatus, and to provide a moveable deflector plate for deflecting objects out of the normal crop path under the control of an actuator responsive to the vibration detector. Such an apparatus is described in our U.K. Patent No. 1602475.

It is also known to provide on a forage harvester an electromagnetic metal detector incorporated in the feed roller system, and to arrange the detector with its field of sensing directed in various positions so as to attempt to avoid interference from metal components of the apparatus, or to attempt to give a predetermined interference which can be filtered out or otherwise dealt with by electronic circuitry. Such arrangements are discussed in a paper entitled Electronic Metal Detection for Forage Harvesters by C. E. Bohman and T. L. Stiefvater, in Grain and Forage Harvesting, pages 270 to 273, published in Proc. Int. Grain & Forage Harv. Conf. ASAE/CIGR, Ames, Iowa, Sept 1977.

It is also known that in order to make it possible for high-speed crop engaging rotors to lift fibrous crops for purposes of treating and/or conveying the material, it is necessary to provide a housing, also known as a hood, shroud, cowling or cover, over at least the front part of the rotor. The shape of the hood and its relative position to the rotor, particularly the vertical clearance above the crop layer to be engaged and the radial clearance at the intake and exit regions, vitally affect the performance and power requirement of the unit as a whole. Because crop yields may vary from very light to exceptionally heavy, adjustment is needed in the vertical and radial clearances of the hood at the intake region. It is known to provide over a pick-up rotor a rotor cover which is pivotted to allow movement of the pivotted rotor cover away from the rotor. Such an arrangement is shown for example in FIG. 1 of U.S. Pat. No. 3,676,988 (Hauser-Lienhard), and in FIG. 9 of GB Patent No. 1214S40 (Vissers).

The present invention is not concerned with relatively slow-speed pick-ups of the type in which tines are moved along a path predetermined by a cam track, scoop up previously cut crop, and have the crop removed from the tines by cooperation with a series of metal straps adjacent to slits through which the tines move. The present invention is concerned with high-speed pick-up rotors. In one aspect, a high-speed pick-up rotor may be regarded as a rotor driven at a speed of rotation such that at least at the region where the crop is picked up, the crop engaging elements move faster than the crop during acceleration, that a housing in front of at least part of the rotor above the intake region prevents crop from being thrown forward, and that at the release region the crop is released at least predominantly by the effect of centrifugal force, although the release may be assisted by additional means. In another aspect, a high-speed pick-up rotor may be regarded as a rotor which accelerates material with which it comes, or is brought, into contact and is capable of transferring the material into a different plane or path of movement. In a further aspect, a high-speed pick-up rotor may be regarded as a rotor which accelerates material by lifting it against the resistance provided by a front cover through a restriction into a diverging passage. By way of example a high-speed rotor may operate at rotational speeds in the range 400 to 900 rev/min. By another criterion, the rate of rotation may be such that the circumferential tip velocity of a crop engaging element is in the range 10 to 25 m/s.

It is an object of the present invention to provide in conveying apparatus an improved arrangement for detecting and rejecting foreign objects.

According to the present invention there is provided conveying apparatus comprising a main frame, a high-speed conveying rotor for accelerating and conveying material, a hood co-operating with the rotor and defining between the hood and part of the periphery of the rotor a passage along which material is conveyed by the rotor, detection means for detecting unwanted objects conveyed by the rotor with the material, and diverting means for diverting for a short period of time that portion of the material stream containing the unwanted object so that it is prevented from proceeding further in the general direction of normal material flow, the detection means comprising a metal detector for detecting metal by generating an atypical signal caused by the presence of metal in the material stream.

Preferably the detection means further comprises an impact detector for detecting impacts on the inner side of the hood of unwanted objects other than the material being conveyed.

The invention has particular application where there is provided mounting means for mounting the hood so as to be moveable relative to the rotor during operation, the hood being moveable in response to, and by the effect of, the material to effect automatic adjustment of the clearance at the entrance to the said material flow passage and where the said rotor is mounted for rotation about a substantially horizontal axis, and the drive means is arranged to drive the conveying rotor in rotation in a sense such that the rotor picks up material and carries the material upwardly and rearwardly over the rotor, the said hood extending around at least part of the front half of the rotor.

There is also provided in accordance with the invention apparatus for picking up and conveying crop comprising a mobile frame for movement across the ground, a high-speed conveying rotor for rotation about an axis substantially parallel to the ground for picking up and conveying crop, a hood extending around at least part of the front half of the rotor and defining with the rotor a crop flow passage along which crop is conveyed by the rotor, drive means for driving the conveying rotor in rotation in a sense such that the rotor picks up crop and carries the crop upwardly and rearwardly over the rotor, mounting means for mounting the hood so as to be moveable relative to the rotor during operation, the hood being moveable in response to, and by the effect of, the crop to effect automatic adjustment of the clearance at the entrance to the crop flow passage, detection means for detecting unwanted objects conveyed by the rotor with the crop, and deflection means for deflecting for a short period of time that portion of the crop stream containing the unwanted object so that it is prevented from proceeding further in the general direction of normal crop flow, the detection means comprising a metal detector for detecting metal by generating an atypical signal caused by the presence of metal in the crop stream, and an impact detector for detecting impacts on the inner side of the hood of unwanted objects other than crop.

By a high-speed conveying rotor is meant a rotor for conveying material, mounted in co-operation with a hood extending around part of the rotor, and driven in rotation by drive means, the hood co-operating with the rotor and defining between the hood and part of the periphery of the rotor a passage along which material is conveyed by the rotor, the drive means being arranged to drive the rotor in rotation at a speed such that the rotor accelerates the material during movement of the material through the restriction defined between the hood and the periphery of the rotor; such that, at least during acceleration, the periphery of the rotor moves faster than the material; and such that, after the conveying, the material is released from the rotor at least predominantly by centrifugal effect.

Preferably the detection means is arranged to respond to objects defined by either of two different criteria, namely to respond to any objects (whether metallic or non-metallic) which are relatively heavy (that is to say that they have a density and mass substantially different from the crop), and to respond to any objects (whether large or small) which are metallic. Conveniently the detection of heavy objects is achieved by detecting impact of objects on the underside of the hood (for example by a vibration detector for detecting vibrations in the hood caused by such impact), and the detection of metallic objects is achieved by, for example, an electromagnetic metal detector. However, metallic objects may be detected by other means, for example by density measurements.

Preferably at least one of the said impact detector and the said metal detector are mounted on the moveable hood for movement therewith.

Also in a preferred arrangement, the hood is formed at least in part by a hollow enclosure member, the detection means being mounted in the said hollow enclosure member and being at least partly enclosed thereby. Preferably the detection means is entirely enclosed by the hollow enclosure member of the hood, and preferably is sealed to prevent access of dirt, dust and moisture to the detection means. Conveniently the hollow enclosure member forms a resonance chamber, which improves the detection of impacts by a impact detector as set out above.

The positioning of the impact detector and/or the electromagnetic detector inside a hollow enclosure member has a number of advantages. The detectors, e.g. a number of microphones, are kept clean, and in preferred forms it is possible to arrange for the hollow member to improve the output signal by amplifying the effect of impacts. Als it is possible to mount the microphones within the hollow enclosure member without mounting directly onto a surface which is subject to shock by impact.

In a preferred arrangement, the impact detector and the metal detector are both mounted in the hollow member of a moveable hood, but either the impact detector or the metal detector may be mounted on a member which is static relative to the frame in operation, and which extends across the path of the conveyed crop in a position which leaves the metal detector free from interference by metal components of the rotor, should any be present.

In one arrangement, the said static member is positioned to the rear of the moveable hood and is positioned with its field of detection directed downwardly into the moving stream of conveyed crop through a gap between the hood and the moveable deflector means.

In another arrangement, the electromagnetic detector is positioned in front of the moveable hood with its field of detection directed downwardly towards a region at the front of the conveying rotor.

In preferred arrangements, the mounting means are such as to provide circumferential movement of the hood relative to the frame and around the rotor. The circumferential movement may lie along a circle which is concentric with the centre of the rotor, or more usually the circumferential movement will lie along a curved path spaced from and lying around the outer envelope of the rotor but not along a circular path. In general the term circumferential movement of the hood means movement along a curved path spaced from and lying around the outer envelope of the rotor and such movement may or may not be concentric relative to the rotor.

Preferably the said hood is mounted in such a manner that an increase in crop load increases both the vertical clearance between the front of the hood and the ground and the horizontal clearance between the front of the hood and the rotor at the entrance to the crop flow passage.

Also it is preferred that the mounting means constrains the said hood to move along a substantially predetermined path in response to, and by the effect of, changes in crop load.

Normally, but not essentially, it will be arranged that the hood is moveable in response to, and by the effect of, an increase in crop load to effect an overall increase in the clearance presented to the crop along the crop flow passage. By this is meant that the clearance presented to the crop along the crop passage is not normally at any point reduced in response to an increase in crop load.

In a convenient arrangement, the said mounting means comprises at least two mounting linkages spaced apart along the direction of the crop flow passage, the linkages being arranged to allow movement of the hood upwardly and rearwardly but to constrain the hood to movement along a substantially predetermined path.

The rotor referred to above may in some arrangements comprise any form of pick-up rotor, for example a rotor having a plurality of outwardly directed spring steel tines for picking up cut fodder crop such as grass. However the invention is particularly applicable when used with a rotor as set out in our published pending U.K. patent application No. 2075816A, which comprises a brush-like structure having a multiplicity of stiff resilient elongate elements which are arranged in tufts of brush elements spaced apart along the axis of the rotor; or a rotor as set out in our published pending U.K. patent applications Nos. 2099272A and 21079-63A, both of which disclose pick-up and conditioning rotors in which the crop engaging elements are formed of thick, stiff, plastics sheeting.

Conveniently the impact detector may consist of one or more accelerometers, microphones, or other vibration or acoustic sensors.

The output of the detector may conveniently be coupled by way of a high-pass filter to a comparator circuit. A reference signal source may be connected to the comparator circuit so that output signals from the detection means due to vibrations in the hood having frequencies above the cut-off frequency of the filter and having an amplitude above a predetermined level determined by the reference signal, indicate the impact on the hood of objects differing from the crop, for example, stones and like objects.

Preferably, control means for controlling the deflector means includes a first timing circuit which ensures that, after actuation, the deflector means remains in the path of the detected object for the period of a typical deflection and for a predetermined interval thereafter before being restored to a position outside the crop path. Preferably a second timing circuit is also provided to ensure that after the deflector means has been returned to its normal position (that is to say removed from its position for deflecting stones and the like) it remains in that position for a second predetermined time interval. The purpose of this second interval is to prevent vibrations caused by the restoration of the deflector means from operating the detection means.

Control means may comprise an actuator (preferably a solenoid actuator for a hydraulic ram) coupled to the moveable deflector means and having two stable positions, the actuator being arranged to be set in one stable position in which the deflector means is in the path of the crop stream containing a detected object when the detector means output indicates that an object has been detected, and the actuator being coupled to the timing circuits to be reset to its other stable position at the end of the first timing interval. determined by the first timing circuit. Means may be provided for inhibiting the triggering of the actuator again to its said one position until the end of the second timing interval of the second timing circuit.

The output signals from the electromagnetic detector may be arranged to operate the control means in generally similar manner to that described for the impact detector.

It is to be appreciated that various alternative methods of actuating the crop deflector may be adopted, for example a pneumatic piston or other actuating device.

Preferably the inner surface of the moveable hood or hood portion has a number of changes of direction so as to provide more than one distinct surface around the hood. This makes a recordable impact more likely than if the interior of the rotor were a smooth curve. Stones tend to be flung outwardly by the rotor and to travel around the inside of the hood. Where there is a change of direction in the inner surface of the hood, there are more opportunities for the stone to strike the inner surface of the hood.

The said diverting means may comprise a moveable member which is moveable into the path of the crop stream to deflect an unwanted object from the normal path of crop flow. Alternatively or in addition the diverting means may comprise a moveable member which is moveable out of the path of the crop stream to allow an unwanted object to divert from the normal path of crop flow. In one convenient form the diverting means may comprise one or more doors openable in the underside of a housing beneath an auger for conveying the crop at a position downstream of the high-speed conveying rotor, the doors being openable in response to detection of an unwanted object in the crop stream by the said detection means.

In an alternative form of the invention, the or part of the detecting means may be mounted in a hollow bridge member which extends across the path of conveyed crop and is static relative to the main frame. Thus either or both of the impact detector and the mounted electromagnetic detector mentioned above may be mounted in the static hollow bridge instead of in the hollow enclosure member of movable hood or hood portion.

In addition to the various aspects of the invention which have been set out hereinbefore, there may further be provided in accordance with the present invention, a foreign object detection system based on a high-speed crop conveying rotor with a movably suspended hood or cover over part of the periphery, so constructed that the cover can respond to variations in the crop bulk, and objects picked up with the crop can be sensed, either (I) as a result of them impacting with the moveable hood from beneath, and/or (II) by generating an atypical signal which can be detected (i) by sensing means attached directly or indirectly to the moveably suspended hood portion, and/or (ii) by sensing means which are positioned to remain in a fixed relationship with the pick-up rotor; combined with mechanical means for deflecting momentarily that portion of the crop stream containing the unwanted object so that it is prevented from proceeding further in the general direction of normal crop flow. Preferably the sensing means are enclosed at least partially by a hollow part of the hood or cover.

Possible types of object detection means include acoustic, optical, seismic, magnetic, electromagnetic and other forms using, for example, waves, rays and reflectance techniques. A particularly high degree of effectiveness is achieved when impact sensing of sizeable metallic and non-metallic objects is combined with an independent system of detecting metallic objects of most sizes, including pieces of wire. In such a case, the output signal from the metal detecting means is processed electronically in the same way as the output signal from the impact sensor, there being provided in the electronic circuit an OR/AND gate to accept signals from the two kinds of detector.

In some broad aspects of the invention, it is not always essential that the pick-up rotor be arranged with its axis parallel to the ground and carrying crop upwardly and rearwardly over the rotor. In a much more general and widely applicable case it is merely necessary that the rotor is mounted for rotation to accelerate and convey crop lying on the ground or fed to it by another means, and that the rotor accelerates and conveys the crop upstream of the intake region. This arrangement covers rotors lying at an angle to the horizontal, up to the vertical.

In other broad aspects of the invention, it is not essential that there is provided mounting means for mounting the hood or a portion thereof so as to be moveable relative to the frame during operation, the hood or the hood portion being moveable in response to, and by the effect of, the crop to effect automatic adjustment of the clearance of the entrance to the crop flow passage. Such arrangements encompass the combination of an impact sensor attached to a fixed-position rotor cover and a metal detecting means attached to a separate bridge or other mounting member, which may be fully adjustable. In such arrangements, a hollow enclosure member of the rotor cover may be provided and may be fixed after adjustment.

In general, the invention encompasses in the context of detecting metal objects in a passing crop stream the concepts of open and transparent windows on the stream, and crop collecting/conveying rotors having an outer annular zone which is free from metal components, and rotors being wholly made from non-metallic materials.

In accordance with another aspect of the present invention there may be provided apparatus for picking up and conveying crop comprising a mobile frame for movement across the ground, a high speed conveying rotor mounted for rotation about an axis substantially parallel to the ground for picking up and conveying crop, a hood extending around at least part of the front half of the rotor and defining with the rotor a crop flow passage along which crop is conveyed by the rotor, drive means for driving the conveying rotor in rotation in a sense such that the rotor picks up crop and conveys the crop upwardly and rearwardly over the rotor, and mounting means for mounting the hood so as to be moveable by pivotal movement relative to the frame during operation, hood being moveable in response to, and by the effect of, the crop to effect automatic adjustment of the clearance at the entrance to the crop flow passage, the hood being mounted in such a manner that an increase in crop load produces circumferential movement of the hood around the rotor in the direction of crop flow and increases both the vertical clearance between the front of the hood and the ground and the horizontal clearance between the front of the hood and the rotor at the entrance to the crop flow passage, the shape of the hood and the position of its pivot axis being such that the said movement of the hood is achieved by pivotting of the hood about a single pivot axis.

Conveniently the said single pivot axis is spaced from the inner surface of the hood facing the outer periphery of the rotor, and is spaced from the said axis of rotation of the rotor, and preferably the said single pivot axis of the hood lies between the outer periphery of the rotor and the said axis of rotation of the rotor.

Preferably the said single pivot axis lies at a position higher than the axis of rotation of the rotor and most preferably the said single pivot axis lies at a position higher than the said axis of rotation of the rotor, but lower than the highest portion of the hood when the moveable hood is in its lowest position.

Embodiments of the invention will now be described by way of example with reference to the accompanying drawings in which:

FIG. 1 (*a*) is a diagrammatic perspective view from the front of the apparatus shown in FIG. 1;

Figure 1:
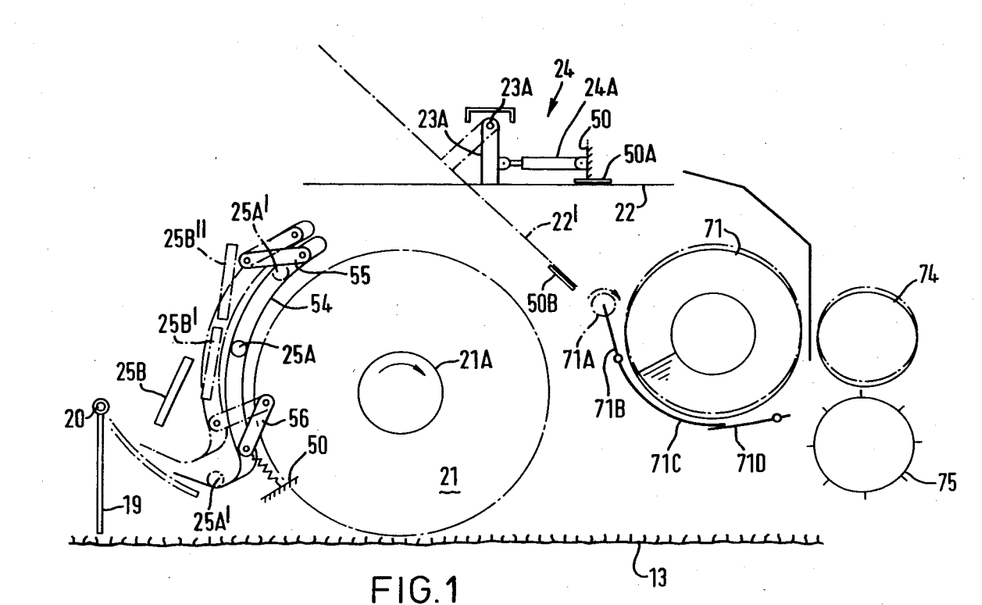
FIG. 1 is a diagramnatic side view of an embodiment of the invention for picking up and conveying a cut crop, and shows a moveable curved hood in front of and partly above a rotor.
Figure 1A:
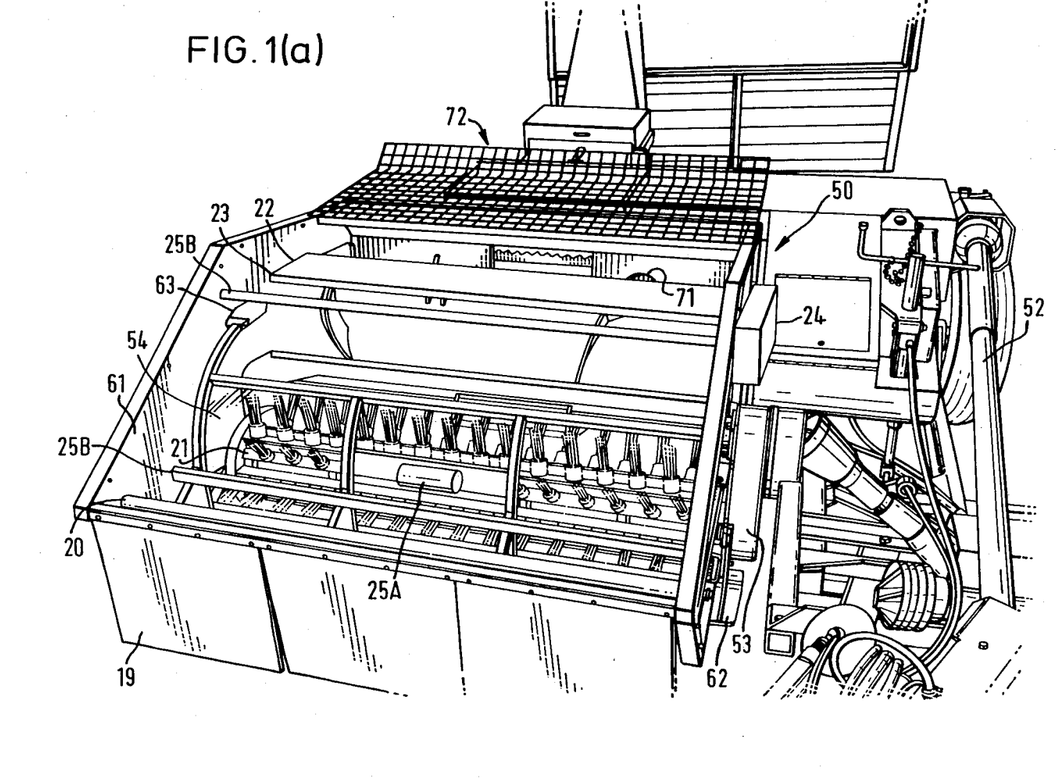

Referring to FIGS. 1 and 1 (*a*), there is shown a crop pick-up apparatus comprising a high-speed rotor 21 mounted on a mobile frame 50 for movement over the ground 13 to pick up previously cut crop. The pick-up rotor 21 is mounted between substantial side plates of the frame 50 and is driven by the pto of a tractor through a conventional drive linkage 52, terminating at 53 (FIG. 1 (*a*)). The rotor 21 is formed of a brush-like structure as set out in our previous published U.K. patent application No. 2075816A, although the rotor may be of other constructions, including those shown in our published U.K. patent applications Nos. 2099272A and 2107963A. In the example as shown in FIG. 1, the rotor 21 is rotated in a clockwise direction so as to pick up cut crop from the ground and to convey the crop upwardly and rearwardly over the rotor 21.

A curved hood 54 extends over the front of the rotor 21, and in the particular example shown is formed of transparent synthetic plastics material, which allows an operator of the apparatus to view the operation of the rotor. The hood is constructed in such a way that it does not effectively obstruct any of the sensors, to be described hereinafter. Referring to FIG. 1, the hood 54 is mounted by two pivotted arms 55 and 56 to the side plate of the main frame 50, and corresponding pivotted arms are provided on the other side of the apparatus. An optional device is linked to the side frame, and biases the hood into the forward and downward position by the effect of a spring. The hood may be adjustably spring loaded.

Suspended in front of the hood 54 is a protective curtain 19 suspended from a bar 20 preceding the rotor 21. The curtain 19 serves the additional purpose of guiding the crop under the floating hood 54. The curtain 19 is shown in its rest position in full lines, and in broken lines there is shown the normal deflected position of the curtain 19 during forward movement of the apparatus over the crop.

In FIG. 1 (*a*), the hood 54 is shown at its lowermost and most forward position. In FIG. 1 the hood is shown in full lines in its closest position to the rotor and in broken lines in the maximum deflected position.

In operation crop is picked up by the rotor 21 and lifted upwardly and rearwardly over the rotor 21 and is fed to a floating auger 71 in a trough for conveying the crop laterally, usually by inverse flighting to the centre region. The auger 71 may rotate in either direction, and the leading edge of the auger trough may be fitted optionally with a freely rotating, or driven, transfer roller 71A to prevent crop accumulations. After the crop leaves the auger 71, two rollers 74 and 75 feed the crop towards a conventional chopping mechanism of a forage harvester, indicated generally at 72 in FIG. 1 (*a*). Where the crop load is light, the hood 54 will be in its rearward and lower position, but where the crop is heavier, either with a greater bulk or higher friction, or a combination of both, the hood 54 will rise upwardly and forwardly to allow greater clearances in the crop passage between the hood 54 and the rotor 21.

As shown particularly in FIG. 1, there is positioned to the rear of the rotor hood 54 a deflector plate 22 extending transversely across the apparatus between the sides of the frame 50. The deflector plate 22 is pivotted at 23 and can pivot downwardly at the rear to a position shown in dotted lines and indicated at 22'.

The deflector plate 22 acts both as a crop guide in normal operation (shown in full lines) and as a deflector for crop contaminated with stones, metal and other objects when in the lower position (shown in broken lines).

The movement of the deflector plate 22 is controlled by a control means 24 indicated diagrammatically by a box shown mounted on the side of the frame 50 at 24 in FIG. 1 (a). The control means 24 may conveniently comprise an electronic control means for analysing detection signals, to be described hereinafter, and a solenoid actuator or pneumatic or hydraulic ram 24A operative to move the deflector plate 22. The plate may be adjustably spring loaded.

Mounted on the moveable hood 54 is an impact sensor (e.g. an accoustic detector), indicated diagrammatically at 25A. The detector 25A is arranged to detect vibrations caused by stones and like objects striking the floating hood 24, and the detector 25A feeds electrical signals to the control means 24.

There is also mounted on the apparatus a second detector comprising for example an electromagnetic detector 25B, which is mounted on a transverse support bar forming a static bridge extending over the path of movement of the conveyed crop and conveniently secured to the sides of the main frame 50. Conveniently the electromagnetic detector 25B comprises a single induction coil or a system of coils producing an electromagnetic field which is disturbed by passage of metal objects in the crop stream, the coil or coils being arranged to detect any such disturbance and feed corresponding electrical signals to the control means 24.

It is to be noted that instead of the rejection of the short section of the crop stream containing the unwanted object being achieved by the overhead deflector plate 22, the leading portion of the feed auger trough can be made to pivot or slide upwards to block the entrance to the trough, and optionally this may be combined with the overhead deflector plate 22, or a shorter separate flat or curved deflecting means, pivotting downwardly. Optionally also, the trough 71B beneath the feed auger 71 operating in the undershot mode may consist of two pivotted doors (similar to "bomb" doors on an aircraft) which can be triggered to open away from each other in response to a detector signal, the actuating mechanism being so designed that a smaller downstream door 71D opens marginally before and closes marginally after an upstream door 71C. As an alternative, a larger, single, "bomb" door may be pivotted upstream. With the "bomb" door system of object removal, it becomes unnecessary to leave a gap between the high-speed pick-up rotor 21 and the feed mechanism 71 of the harvester.

Figure 3:
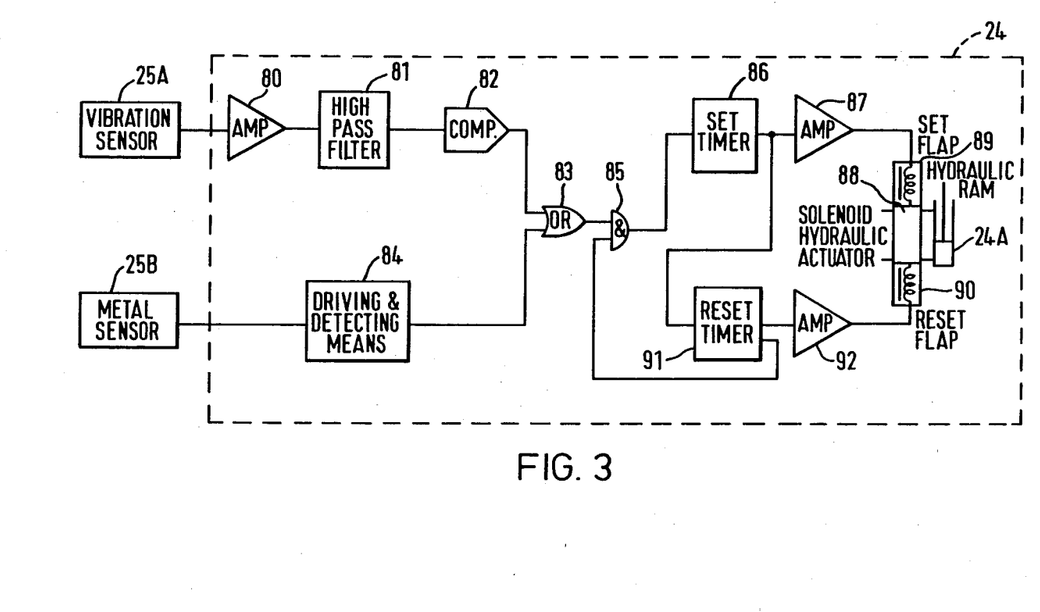
FIG. 3 is a block circuit diagram of means for detecting stones and metal and for controlling a deflector means shown in the preceding figures.

In FIG. 3 there is shown a diagrammatic block circuit diagram of the control means 24. The vibration detector 25A feeds outward signals to an amplifier 80 which passes the amplified signal to a high pass filter 81 for filtering out signals resulting from vibrations occurring during normal operation of the device. The output of the high pass filter 81 is fed to a comparator 82 which compares the vibration signal with a threshold value, and provides an output if the vibration signal exceeds a predetermined value. The output of the comparator 82 is fed to an OR gate 83.

The metal sensor 25B similarly feeds output electrical signals to driving and detecting means 84 which effect similar amplifying, filtering, and comparison functions to the components 80, 81 and 82. The driving and detecting means 84 produces an output signal when a typical signal is detected by the metal sensor 25B, and the resulting output signal is fed to the OR gate 83.

The output of the OR gate 83 is fed to a AND gate 85, the output of which is fed to a set timer 86 which determines the time for which the deflector plate 22 shall be lowered, upon detection of an unwanted object. The output of the set timer 86 is amplified in amplifier 87 and fed to a solenoid hydraulic actuator 88, which has a solenoid 89 for setting the deflector plate 22 to the lower position, and an actuator 90 for resetting the plate 22 to the upper position. The hydraulic actuator 88 is coupled hydraulically to the hydraulic ram 24A.

The output of the set timer 86 is also fed to a reset timer 91, the output of which is amplified by an amplifier 92 and is then fed to the reset solenoid 90 of the hydraulic actuator 88. The output of the reset timer 91 is also inverted and fed to the second input of the AND gate 85 so that this input is normally held at a logical high level. The reset timer 91 is arranged to provide an output to the reset solenoid 90 at the time the system is turned-on so that in normal operation the plate 22 is held in the upper position by the ram 24A, and one input of the AND gate 85 is normally receiving an output signal from the reset timer 91.

In operation, if either the vibration sensor 25A, or the metal sensor 25B, (or both), produce a signal indicating presence of an unwanted object, a trigger signal passes through the OR gate 83 and the AND gate 85 to the set timer 86 which energises the set flap solenoid 89 so that the actuator 88 actuates the ram 24A to lower the plate 22. After a predetermined time the reset timer 91 produces an output signal which actuates the reset flap solenoid 90 to raise the plate 22, and at the same time removes the signal from the AND gate 85 to disable the circuit from responding to any vibrations which might be caused when the deflector means are raised. After a second pre-determined time the reset time 91 reverts to its normal state and feeds a signal to the AND gate 85 to allow the circuit to be ready for the next object detection signal from the OR gate 83.

If an object is picked up by the rotor, and then falls back to the ground and is lifted up again, perhaps several times, this will result in many impacts. The delay arrangement in the control circuits is such that the plate 22 is held in the deflecting position throughout the multiple impacts, and is only released after the said predetermined time interval has elapsed after the last of the multiple impacts.

In general, the control means 24 may operate so far as the vibration sensor 25A is concerned, in the manner set out in our published U.K. Pat. No. 1602475, and the analysis of signals from the electromagnetic detector 25B may proceed in a generally corresponding manner.

By way of example, the time taken from the instant of a foreign object impacting with the hood and the deflector being in the fully operative position may be <0.2 s and within 1 s of the impact the deflector can be returned to its normal rest position.

Referring now again to FIG. 1, the operation of the apparatus will be considered. On leaving the rotor cover 54, the conveyed crop bridges an air gap between the rotor 21 and the auger 71, and is directed rearwardly by the near-horizontal plate 22 suspended on pivot arms 23A from the pivot 23, and resting on stops 50A of the main frame 50. The hydraulic piston 24A acts on a central pivot arm 23A, there may be provided a number of pivot arms across the width of the deflector plate 22. If the piston 24A is actuated by the object detection system in response to a signal generated by a foreign object, the deflector plate 22 is tilted downwards at the rear until it makes contact with a second set of stops 50B on the side plates of the main frame 50. The crop stream is then directed back towards the rotor 21 and steeply downwardly at the rear so that it passes momentarily through the gap between the pick-up rotor 21 and the housing of the auger 71. At the end of the timed interval, the piston travel in the ram 24A is reversed and the deflector plate 22 is raised, allowing the crop to continue in the normal direction of flow into the auger 71.

In FIG. 1, and also in subsequent figures, there are shown a number of alternative positions of the metal sensor 25B and the impact sensor 25A. In all cases, the metal sensor is indicated diagrammatically by a rectangular symbol, and the impact sensor is indicated by a circle.

In its broadest aspect, the invention encompasses not only the use of an impact sensor to detect objects, but also, in combination therewith or independently thereof, a system for detecting the presence of metallic objects by measuring a parameter of the crop flow, and detecting in that measured parameter an atypical signal resulting from the presence of metal. Apart from impact sensing, possible types of object detection include optical, seismic, magnetic, electro-magnetic, and other forms using, for example, waves, rays and reflectance techniques. Apart from impact sensing, most other detection techniques require transparent or open "windows" on the crop stream, if they are to be sufficiently sensitive and effective. A transparent window is provided if all of the moving hood or that portion between the sensor and the crop stream, is made of material which does not interfere with the sensing means. Such material will often be non-metallic, particularly of plastics, resins or compound materials. An open window is provided where there is an aperture between the crop stream and the sensing means which is totally unobstructed. In contrast, a transparent window provides a physical barrier to the crop, but not to the sensing means.

Consideration must also be given to the materials from which the rotor, and other apparatus components, are made, in that the detecting means may include in its field of view moving components which may interfere with detection. A choice may be made as to whether the sensor should be a fixed position sensor which is fixed relative to the main frame, or a moving sensor where the sensor is secured to the moving hood or moving hood portion. Where the detecting means has a fixed position (both with regard to distance and angular relationship) to any part of the pick-up rotor which may interfere with the detection system, this facilitates avoidance of strong interference signals from machine components, by techniques of focusing the sensitive field or zone, or by filtering, programming out, or otherwise taking account of regular interference signals.

On the other hand, if the detecting means is fixed relative to the main frame, the location of the crop stream relative to the fixed-position sensors may change, albeit marginally, when the moveable hood portion responds to changes in crop flow. The converse applies where the sensors are mounted to move with the moving hood portion. In such a case the position of the sensor changes relative to the rotor when the hood moves, but the position of the sensor may be arranged to be constant relative to the crop stream.

Present rotors may have a large metal-free annular outer space surrounding the potential interference source at the core section. While it is possible to account for interference signals from the present core section, it is preferable to focus the detection means so that the field or zone of greatest intensity is directed past the core section above or below. This is more easily and consistently achieved with fixed-position sensors, but is not impossible when the sensing means is attached to the moveable hood. Thus in embodiments of the invention, the annular outer space of the pick up rotor is usually metal-free, and the core section may or may not contain metal components. It is possible to produce a high-speed pick-up rotor which is transparent to sensing means throughout the space which the rotor occupies, for example by using finned reinforced resin cores and plastics fasteners for the elements. Vertical end plates which define the rotor housing at each side may also be made of non-metallic material, or may be largely omitted. Similarly, the floating rotor hood and the suspension linkage may be made entirely of non-metallic shatter proof material, or alternatively only that part which acts as a window on the crop stream for a metal sensor may be made of material which is transparent to the sensing means.

Referring again to FIG. 1, in full lines, there is shown attached to the hood in the mid region the impact sensor 25A, which may be one of several, so positioned that ideally it is not in the field of scan of the separate metal sensing means 25B which covers the full width of the rotor housing. Alternative positions for the impact sensing means are indicated in broken lines, and these are to be regarded as examples with other positions being also possible. Attachment of the impact sensors is in such a way that they are able to pick up atypical vibrations but are not physically harmed by the impacts themselves.

In front of the transparent rotor housing 54 is shown in full outline the metal sensing bridge 25B, so focused that it scans through the crop flow into the metal-free space in front of and beneath the rotor core section which is indicated at 21A. Metal sensing elements in the alternative positions shown in broken outline, may be secured in a fixed position relative to the rotor 21, or may be attached to the moving hood 54. A metal sensor at the position indicated at 25B' scans practically horizontally through the crop stream in the direction of the rotor core 21A, whilst a metal sensor at the upper position indicated at 24B" is focused into the space above the rotor core 21A.

Figure 2:
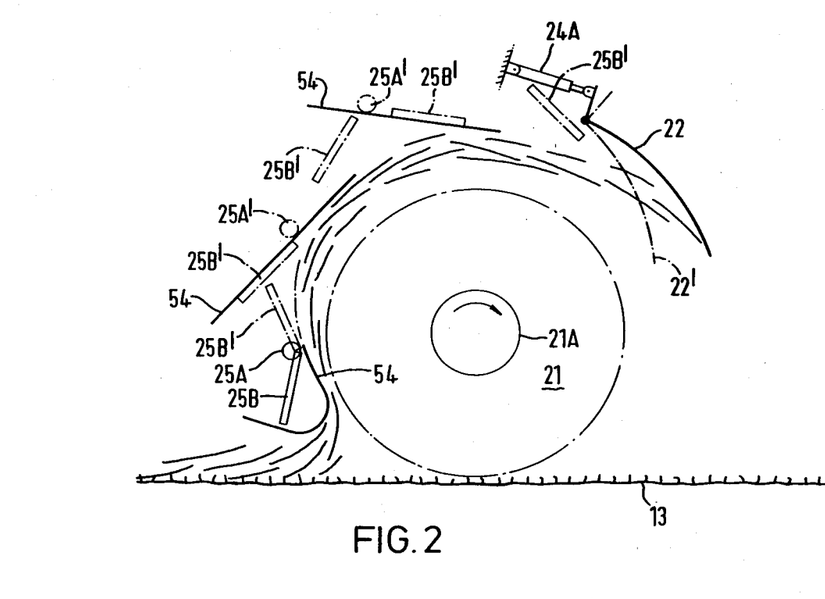
FIG. 2 is a diagrammatic side view of a modification of the apparatus shown in FIG. 1.

FIG. 2 shows various modifications of apparatus embodying the invention. The moving portion 54 of the rotor front cover is shown to be so designed that a number of open windows on to the crop stream are created. Open windows are created between the moving hood section, and the forward part of a top fixed cover, and between that cover and the crop deflector plate 22. These open windows can be covered if necessary by a metal detecting bridge element. The moveable hood 54 is shown only in the closest position to the rotor 21. The lowest metal sensing element 25B is shown fitted forward of a channel portion 54 which is transparent to the detecting means 25B, the channel portion 54 also serving the purpose of guiding the crop into the pick up rotor 21. The alternative sensor positions 25B' may represent metal sensors in a fixed position, for example attached to the static side plates of the frame, or fixed to the moving housing. Similarly, alternative positions of the impact sensor 25A are also shown at 25A'. It should be noted that the metal detection means may be adjustable angularly, and in terms of its position up and down and fore and aft relatively to the conveying rotor.

Figure 4:
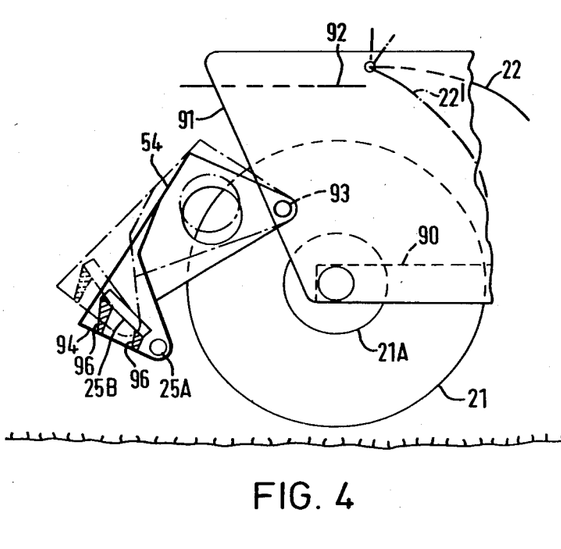
FIGS. 4 and 4 (*a*) show a diagrammatic side view and diagrammatic front view respectively of a further embodiment of the invention.
Figure 4A:
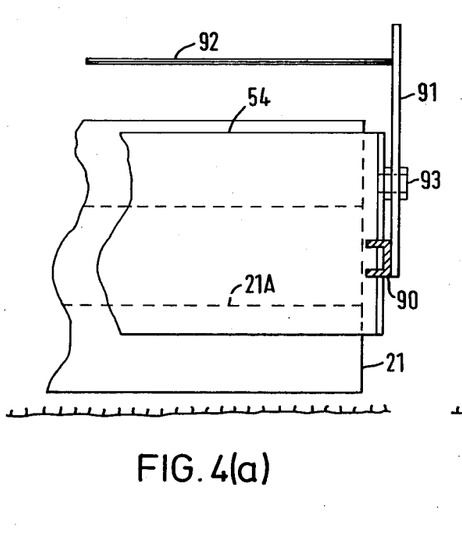

FIGS. 4 and 4a show respectively a diagrammatic side view, and a front view, of a further modified crop pick-up apparatus which embodies the invention. The rotor 21 is mounted at the end of a cantilevered support member 90 to which is also fitted a plastics side sheet 91. Between the side sheets 91 are fitted pivotally a front hood assembly 54, made preferably from fibreglass, with metal sensing means 25B and an impact sensor 25A. The apparatus has a static top cover 92, and a pivotted rear deflector plate 22. The operation of the apparatus is generally similar to that described with reference to the preceding figures.

It is to be noted that the apparatus shown in FIG. 4 provides an inventive concept independent of the invention set out hereinbefore in connection with an object sensing system. In accordance with this independent aspect of the invention, there is provided apparatus for picking up and conveying crop comprising a mobile frame for movement across the ground, a high speed conveying rotor mounted for rotation about an axis substantially parallel to the ground for picking up and conveying crop, a hood extending around at least part of the front half of the rotor and defining with the rotor a crop flow passage along which crop is conveyed by the rotor, drive means for driving the conveying rotor in rotation in a sense such that the rotor picks up crop and carries the crop upwardly and rearwardly over the rotor, and mounting means for mounting the hood so as to be moveable relative to the frame during operation, the hood being moveable in response to, and by the effect of, the crop to effect automatic adjustment of the clearance at the entrance to the crop flow passage, the hood being mounted for movement by pivotting about a single pivot axis and the shape of the hood and the relative position of the pivot axis and the axis of rotation of the rotor being arranged such that an increase in crop load increases both the vertical clearance between the front of the hood and the ground and the horizontal clearance between the front of the hood and the rotor at the entrance to the crop flow passage. By selecting the position of pivot point 93, together with the shape of the moveable hood portion 54, particularly the inclination of the exit portion, a wide range of variations in rotor housing clearances and crop flow characteristics may be obtained.

The main feature shown in FIGS. 4 and 4(a) is that, in accordance with the present invention, the movable hood portion 54 is formed in part by a hollow enclosure member 94. The electromagnetic detector 25B and the vibration sensor 25A are both mounted inside the hollow enclosure member 94. The electromagnetic detector 25B is mounted resiliently by mounts 96, and the vibration detector 25A is mounted on the inside of the member 94 by means (not shown) which allow the detector 25A to detect vibrations, but which protect the detector 25A from damage due to impact of substantial objects on the enclosure member 94.

Preferably the enclosure member 94 provides a total enclosure for the detector means 25A and 25B, and is sealed to prevent entry of dirt, dust, and moisture. Conveniently the whole movable hood portion 54 is made of glass fibre, or other moulded synthetic material. Preferably the sensors 25A and 25B are mounted as low as possible within the enclosure member, to maximise the response time available for the mechanical rejection system 22.

It is to be appreciated that the hollow rotor cover the principle of which is shown in FIG. 4, can also be provided in embodiments of the invention generally along the lines of the apparatus shown in FIG. 1, that is to say with the moving hood portion supported on two spaced apart links along the trajectory of the crop flow.

Figure 5:
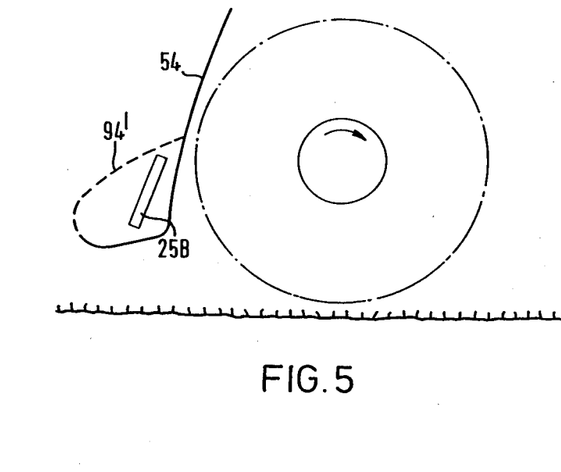
FIGS. 5, and 6 show diagrammatic side sections of alternative forms of hollow hoods which may be used in the apparatus of FIG. 4 or FIG. 1, in embodiments of the invention.
Figure 6:
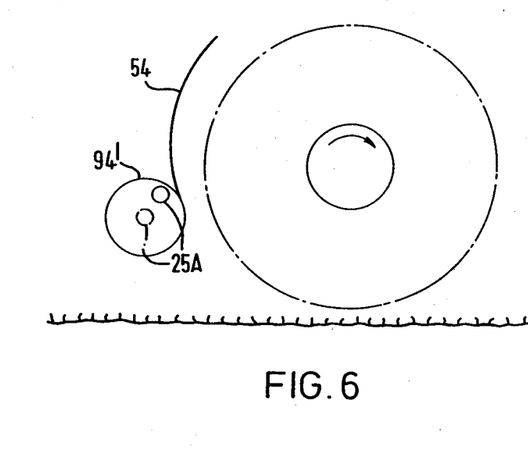

In FIGS. 5 and 6 there are shown diagrammatically two further forms of a hollow enclosure member 94 which may house an electromagnetic detector 25B (FIG. 5) or a vibration sensor 25A (FIG. 6). In each case the hollow enclosure member 94 may be mounted on a movable hood portion, which may be a hood portion 54 in FIG. 4 or a hood portion 54 in FIG. 1. Alternatively, in FIG. 5, the metal sensing element 25B may be a fixed position metal sensing element, and may be fitted forward of the intake guide plate, for example in the pear-shaped enclosure member 94 shown in FIG. 5. In FIG. 6, the impact sensing element 25A is attached inside the front guide tube 94' of the hood portion 54, in such a way that the sensing element 25A remains undamaged by impact. The tube 94' forms a resonance chamber, and the element may be optionally fitted at or near the centre. The ends of the tube may be sealed off, and pressure waves generated by impacts may be detected by pressure sensitive devices. Optionally the tube may be filled with liquid e.g. light oil.

Figure 7:
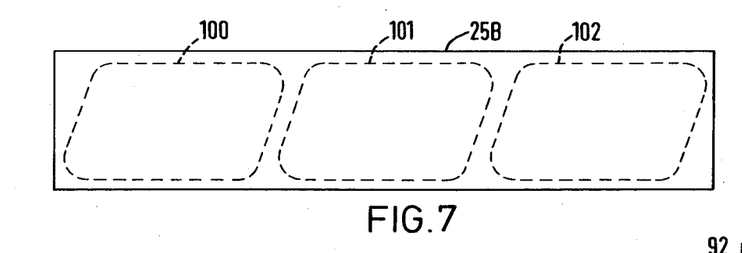
FIG. 7 is a diagrammatic front view of an arrangement of coils in an electromagnetic detector embodying the present invention.

FIG. 7 is a front view of an example of a metal detecting bridge, indicating in broken lines three trapezoidal, overlapping induction coils 100, 101, 102, which may be energised in turn to avoid gaps in the electromagnetic field created by the elements as a whole. For most applications on harvesting machines, it will be an advantage for the bridge elements to be adjustable angularly, up and down and fore and aft relative to the crop stream.

With reference to FIG. 7, because crop windrows for harvesting are usually heap-shaped in cross-section, it is desirable that the sensitivity of a metal detection system is particularly high in the central region of the pick-up unit, where crop flow is concentrated. Higher sensitivity in the centre of the detector bridge shown in FIG. 7 may be achieved relative to the outer coils by arranging for the energising current in the central coil to be higher. It should be noted that if current flow is equal and in the same direction in all the coils, electro-magnetically those parts of the loops which lie closely adjacent cancel each other out, and the effect of the coil arrangement becomes that of one large coil. Instead of the trapezoidal coil shape shown in FIG. 7, the coils may be circular, square, hexagonal or polygonal in shape. By again arranging them transversely so that they overlap at least marginally across the direction of crop flow, this ensures complete coverage of the pick-up width. A circular or square coil shape may be found in many existing applications, and therefore mass-produced elements may be combined economically to cover readily in any width of pick-up unit. Using an array or succession of small coils, instead of one large coil, facilitates and makes more attractive and practical the use of printed-circuit coils.

Figure 8:
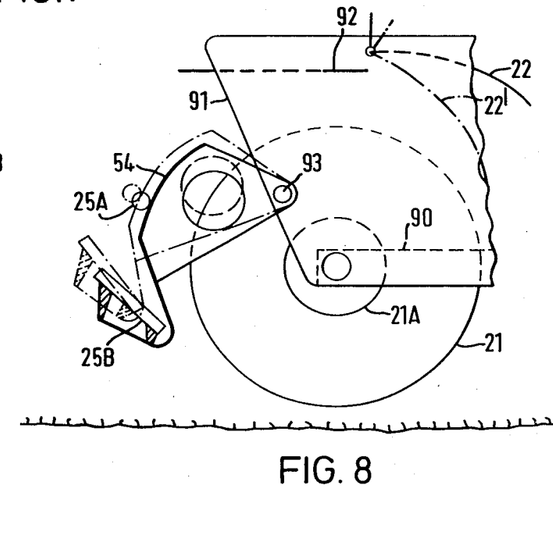
FIG. 8 and 8 (*a*) show a diagrammatic side view and diagrammatic front view respectively of a further embodiment of the invention.
Figure 8A:
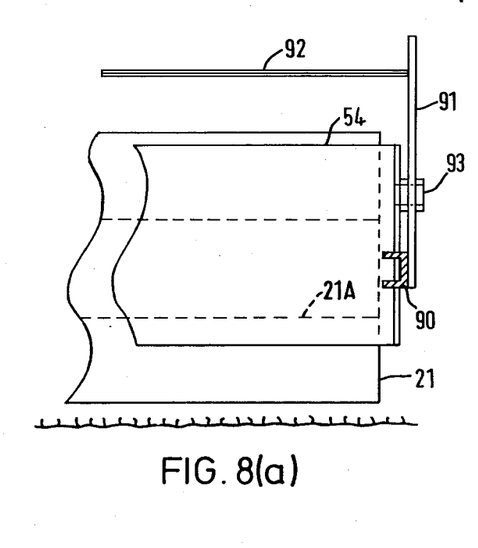

FIGS. 8 and 8(a) show respectively a diagrammatic side view, and a front view, of a further modification of a crop pick-up apparatus embodying the invention. The rotor 21 is mounted at the end of a cantilevered support member 90 to which is also fitted a plastics side sheet 91. Between the side sheets 91 are fitted pivotally a front hood assembly 54, made preferably from fibreglass, with metal sensing means 25B and an impact sensor 25A. The apparatus has a static top cover 92, and a pivotted rear deflector plate 22. The operation of the apparatus is generally similar to that described with reference to them preceding figures.

It is to be appreciated that, in its broadest aspect, the system described in this patent application is suitable, provided appropriate adaptation is carried out, for inclusion in grain and other crop and material conveying systems, whether they are stationary or part of mobile harvesting or processing equipment, for example combine harvesters, pea viners, and so on.

I claim:

1. Apparatus for picking up and conveying crop comprising:
    a mobile frame for movement across the ground;
    a high speed conveying rotor for rotation about an axis transverse to the direction of forward movement of the apparatus and substantially parallel to the ground for picking up and conveying crop, the conveying rotor comprising an inner core structure and a plurality of outwardly extending crop engaging elements, said crop engaging elements being made of non-metallic material so as to provide an outer annular zone of the rotor which is free of metal components;
    a hood extending at least around part of the front half of the rotor and defining between the hood and part of the periphery of the rotor a crop flow passage along which crop is conveyed by the rotor;
    drive means for driving the conveying rotor in rotation in a sense such that rotor picks up crop and conveys the crop upwardly and rearwardly over the rotor, the drive means being arranged to drive the rotor in rotation at a speed such that the rotor accelerates the crop during movement of the crop through the passage defined between the hood and the periphery of the rotor, such that at least during acceleration the periphery of the rotor moves faster than the crop, and such that after the conveying the crop is released from the rotor at least predominantly by centrifugal effect;
    detection means for detecting unwanted objects conveyed by the rotor with the crop, the detection means comprising a metal detector for detecting metal by sensing an atypical response to a signal generated by the metal detector caused by the presence of metal in the crop stream, and an impact detector for detecting impacts on the inner side of the hood of unwanted objects other than crop, both the metal detector and the impact detector being mounted on the hood at positions forward of a vertical plane passing through the rotor axis, the metal detector being mounted at a position close to the entrance to the said crop flow passage with its field of detection directed downwardly and rearwardly and extending into the outer annular zone of the rotor which is free from metal components, and
    diverting means for diverting for a short period of time that portion of the crop stream containing the unwanted object so that it is prevented from proceeding further in the general direction of normal crop flow, said diverting means comprising a moveable member which is positioned to the rear of the rotor centre and which is moveable into the path of the crop stream leaving the rotor, so as to deflect an unwanted object out of the normal path of crop flow downwardly to the ground.

2. Apparatus according to claim 1 including mounting means for mounting the hood so as to be moveable relative to the rotor during operation, the hood being movable in response to, and by the effect of, the material to effect automatic adjustment of the clearance at the entrance to the said material flow passage.

3. Apparatus according to claim 1 in which the said hood includes a wall having an inner side facing the periphery of the rotor, and the said impact detector is mounted on the other, outer, side of the said wall, the impact detector being mounted at a position close to the entrance to the said flow passage.

4. Apparatus according to claim 1 in which the hood is formed at least in part by a hollow enclosure member, and the impact detector is mounted in the said hollow enclosure member and is at least partly enclosed thereby.

5. Apparatus according to claim 4 in which the hollow enclosure member forms a resonant chamber, which improves the detection of impacts by the impact detector.

6. Apparatus according to claim 4 in which both the impact detector and the metal detector are mounted in the hollow member of the moveable hood.

7. Apparatus according to claim 6 in which the said enclosed components are entirely enclosed by the hollow enclosure member of the hood, and is sealed to prevent access of dirt, dust and moisture to the detection means.

8. Apparatus according to claim 1 in which the inner surface of the movable hood has at least one change of direction so as to provide more than one distinct surface around the hood, arranged to increase the chances of a recordable impact on the interior of the hood.

9. Apparatus according to claim 1 in which the said metal detector generates, in the presence of metal, an atypical signal selected from the group comprising optical, seismatic, magnetic, and electromagnetic signals.

10. Apparatus according to claim 1 in which the said metal detector comprises an electromagnetic detector for detecting changes in an electromagnetic field which are caused by the presence of metal in the crop stream.

11. Apparatus according to claim 1 in which the said impact detector is selected from the group comprising accelerometers, microphones, and other vibration and acoustic sensors.

12. Apparatus according to claim 3 in which said mounting means constrains said hood to move along a substantially predetermined path, the hood being mounted in such a manner that an increase in crop load produces circumferential movement of the hood in the direction of crop flow along a curved path spaced from and lying around the outer periphery of the rotor, and increases both the vertical clearance between the front of the hood and the ground and the horizontal clearance between the front of the hood and the rotor at the entrance to the crop flow passage, the shape of the hood and the position of its pivot axis being such that the said movement of the hood is achieved by pivotting of the hood about a single pivot axis.

13. Apparatus according to claim 12 in which the said single pivot axis is spaced from the inner surface of the hood facing the outer periphery of the rotor, and is spaced from the said axis of rotation of the rotor.

14. Apparatus according to claim 12 in which the said single pivot axis of the hood lies between the outer periphery of the rotor and the said axis of rotation of the rotor.

15. Apparatus according to claim 12, in which the said single pivot axis lies at a position higher than the axis of rotation of the rotor.

16. Apparatus according to claim 15 in which the said single pivot axis lies at a position higher than the said axis of rotation of the rotor, but lower than the highest portion of the hood when the moveable hood is in its lowest position.

* * * * *